(12) United States Patent
Bhuiyan et al.

(10) Patent No.: US 11,196,749 B2
(45) Date of Patent: Dec. 7, 2021

(54) SYSTEM AND METHOD FOR CONTROLLING A MULTI-TENANT SERVICE-ORIENTED ARCHITECTURE

(71) Applicant: ORACLE INTERNATIONAL CORPORATION, Redwood Shores, CA (US)

(72) Inventors: Helali Bhuiyan, Redmond, WA (US); Geoff Hopcraft, Seattle, WA (US); Gayathri Premachandran, Sammamish, WA (US); Jinai A, Kirkland, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 281 days.

(21) Appl. No.: 16/395,905

(22) Filed: Apr. 26, 2019

(65) Prior Publication Data
US 2020/0344235 A1 Oct. 29, 2020

(51) Int. Cl.
*H04L 29/06* (2006.01)

(52) U.S. Cl.
CPC ........ *H04L 63/102* (2013.01); *H04L 63/0853* (2013.01); *H04L 63/20* (2013.01)

(58) Field of Classification Search
CPC .................. H04L 63/102; H04L 63/0853
USPC ............................................................ 726/1
See application file for complete search history.

(56) References Cited

U.S. PATENT DOCUMENTS 10,348,720 B2 * 7/2019 Jakobsson ............... G06F 21/60

* cited by examiner

*Primary Examiner* — Anthony D Brown
(74) *Attorney, Agent, or Firm* — Kraguljac Law Group, LLC

(57) ABSTRACT

Systems, methods, and other embodiments associated with controlling a multi-tenant service-oriented architecture are described. In one embodiment, a method includes providing a collection of policies based upon who can access information of a user, wherein the information of the user is managed by a second service. A multi-tenant control module determines if a first service is able to contact the second service and obtain access to the user's information through the second service. An authentication service works in conjunction with the first and second services to assist in determining if the first service is able to contact the second service and obtain access to the user's information through the second service.

20 Claims, 4 Drawing Sheets

SYSTEM AND METHOD FOR CONTROLLING A MULTI-TENANT SERVICE-ORIENTED ARCHITECTURE

BACKGROUND

In a multi-tenant cloud system, each customer has their own tenant (an account or subscription), which owns a set of resources (computers, disks, networks, etc.). A user from one tenancy cannot typically access resources owned by another tenancy. However, a cloud infrastructure system is typically composed of hundreds of micro services that communicate to each other. These services also need to access customer resources.

Each interaction or call made through the use of an application programming interface (API) is made by either a customer or a service and needs to be properly authenticated (determine who the caller is) and authorized (is this authenticated caller allowed to make this call?).

Services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In existing cloud services (e.g., AWS, Azure), when a service calls another service to access a customer resource, they use mTLS/SSL or mutual transport layer security, which provides encryption of the traffic and optional authentication of both the services (caller and receiver) in a call. From the exchange of x509 certificates, when an mTLS connection is set up, both of the services know they are talking to a known and trusted service. If a successful connection is established, both the caller and receiver services are authenticated and authorized to each other. By the virtue of having a successful connection, the caller service is granted access to customer resources without having a separate authorization check (e.g., does this caller service have permission to access this customer resource?). However, this approach has some basic problems. One, this approach gives the caller service very broad power. Secondly, it is near impossible to grant any fine-grained access. Thirdly, auditing of operations is not transparent. Finally, this approach also makes setting up a new service-to-service communication expensive.

Previous systems also do not provide a very scalable solution for authentication. Imagine a cloud with hundreds of services, each talking to each other. Each of these services has to trust each other's certificate in order to property authorize a caller. These prior systems also give a very broad power to these services. Again, there is no fine-grained way to define whether a service should be able to call another service.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
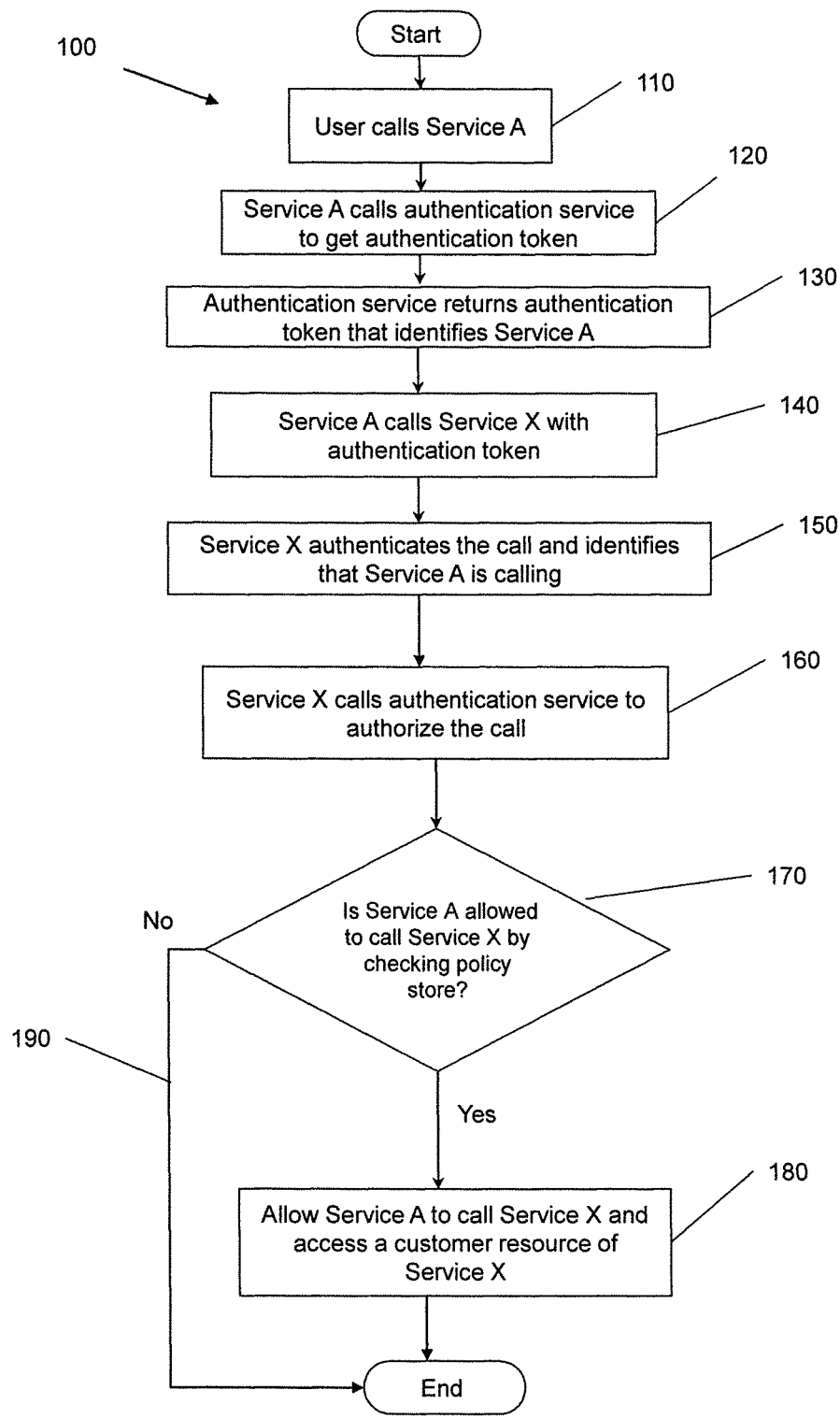
FIG. 1 illustrates one embodiment of a method for controlling a multi-tenant service-oriented architecture, according to the present invention.

Computer-implemented systems and methods are described herein that control a multi-tenant service-oriented architecture. In one embodiment, the method for controlling a multi-tenant service-oriented architecture does not depend on a mutual transport layer security (mTLS) connection for authorization but, instead uses a system policy approach method. In one embodiment, authorization decisions are based on evaluating policies written by the system administrator of the tenant and the system administrator of the cloud solutions provider. Since the cloud solutions provider knows the architecture of its cloud architecture, the policies written by the system administrator of the cloud solutions provider are configured to allow only selected services to get access to correct customer resources. Furthermore, the policies written by the system administrator of the tenant will define which user from their tenancy gets to access what resources.

As discussed earlier, prior systems and techniques depend on an mTLS connection for authorization. In one embodiment, the present system uses a system policy approach method, instead. Without the present system and method, there is no scalable solution. For example, a cloud service may have hundreds of services, each talking to each other via service-to-service communications. Each of these services has to trust each other's certificate to properly authorize a caller (e.g., a service calling another service). Clearly, this prior system and technique, gives a very broad power to these services. Furthermore, there is no fine-grained way to define whether a service should be able to call another service. Instead, it is desirable to utilize a system that includes a multi-tenant service-oriented architecture that does not depend on mTLS connection for authorization but, instead uses a system policy approach method. In this manner, authorization decisions are based on evaluating policies generated and defined by the cloud solutions provider administrator and the tenancy administrator.

Another point to consider is that any authentication/authorization system should try to avoid placing any cumbersome tasks on the customer since the customer will probably not be familiar with the internal service architecture of the cloud solution provider's system. Given this, the tenancy administrator will then be unlikely to be able to write policies that will allow the internal services of the cloud service provider to adequately access the resources of the customer. Again, the solution to this problem is to use the present system of controlling a multi-tenant service-oriented architecture. In particular, the cloud solution provider will provide a collection of policies. More importantly, since the cloud solution provider knows the architecture of their cloud solution, the cloud solution provider write policies that will ensure that only necessary services will be properly authenticated and authorized in order to access the desired customer resources. This removes the burden from the customer in terms of knowing the internal services of the cloud solution provider while ensuring that the proper security principles are followed.

A unique practical aspect of the present system is that the system does not depend on mTLS connection for authorization but, instead use a system policy approach method. All authorization decisions will be based on evaluating policies. In particular, the tenancy administrator of the customer's tenancy will write their own policies related to the customer's tenancy. It is to be understood that these system policies will then define which user from their tenancy gets to access what resources.

However, it will be cumbersome for customers, and sometimes impossible, to know the internal service architecture of the cloud solutions provider. Consequently, the tenancy administrator will be unable to properly write policies that will allow the internal services of the cloud solutions provider to access the resources of the customer's tenancy.

Another unique practical aspect of the present system is to use a system policy approach of the present system that involves the cloud solutions provider. In particular, in the present system, there will also be a collection of policies that the cloud solutions provider will write. Since the cloud solutions provider knows the architecture of their cloud, the cloud solutions provider system administrator will make sure only necessary services get access to correct customer resources.

A further unique practical aspect of the present system is that the present system removes the burden from the customer to know about the cloud solutions provider's internal structure and the new features being proposed. At the same time, proper security principles will be ensured. Instead of depending on very broad access power of services, each service will have to satisfy policy conditions, which can be very fine-grained.

With reference to FIG. 1, a computer-implemented method 100 is illustrated that describes one embodiment for controlling a multi-tenant service-oriented architecture. The method 100 is performed by at least a processor of a computer system that accesses and interacts with memories and/or data storage devices. For example, the processor at least accesses and reads/writes data to the memory and processes network communications to perform the actions of FIG. 1.

Method 100 executes with a presumption that a collection of policies is used that allows a service to access the resources of a customer that are managed/controlled by another service. In particular, the method allows the tenancy administrator of the customer and the administrator of a cloud service provider to write a collection of policies that ensure that only the necessary services get access to the desired customer resources. It is to be understood that each customer has their own tenant (an account or subscription) and each tenant owns a set of resources such as computers, disks, networks, etc.

Each tenant has a tenant administrator who writes policies for that tenant related to who will have access to the resources of the customer and what resources of the customer will be able to be accessed by a service. Furthermore, there will also be a collection of policies that the cloud solutions provider will write. Since the cloud solutions provider knows the architecture of their cloud, the cloud solutions provider system administrator will make sure only necessary services get access to correct customer resources.

Regarding the collection of policies, it is to be understood that policies refer to a set of principles, rules, and guidelines issued by an organization to ensure that information technology users within a domain of the organization or its networks comply with the rules and guidelines related to security of the information stored digitally at any point in the network or within the organization's boundaries of authority. For example, there may be at least one policy that grants the user/instance/service access to a certain operation (e.g., resource). When asked for the authorization decision, the authorization service reviews the collection of policies. As soon as the authorization service finds a policy that grants access to that request, the authorization service grants the access to the request. If no such policies are found, then the authorization service does not grant the access and the authorization fails.

In one embodiment, each policy is composed of a few basic blocks: a subject block which defines who is covered by this policy; an action block which defines what is the allowed permission data (e.g., does the policy grant the requester access to the desired information?); and a location block which defines the location of the policy within the policy store. To grant access to a request, all of the criteria within the blocks have to be met by the access requester, as determined by the authorization service. For example, is there a policy for a particular service requesting access to the information stored in the policy store?, does the policy cover the particular service?, and does the policy grant the service access to the information?. If all of these questions can be answered yes (or true), then the service is granted access to the information.

The policies are stored by a policy compiler. The policies are compiled within the policy store 234 (FIGS. 2 and 4) in a syntax tree format. When the authorization service receives an authorization request, the authorization service obtains the syntax tree format and evaluates the current authorization request. The authorization service determines if all of the criteria within the blocks of the policies stored in the policy store 234 have to be met by the access requester by checking the syntax tree format of a particular policy (or policies). It is to be understood that a periodic check of the policy store by the cloud solutions provider administrator is completed to see if there are any new policies for any tenancy. If a new policy is found, a new policy base (all old and new versions of the policy) for a tenant is then compiled.

Figure 2:
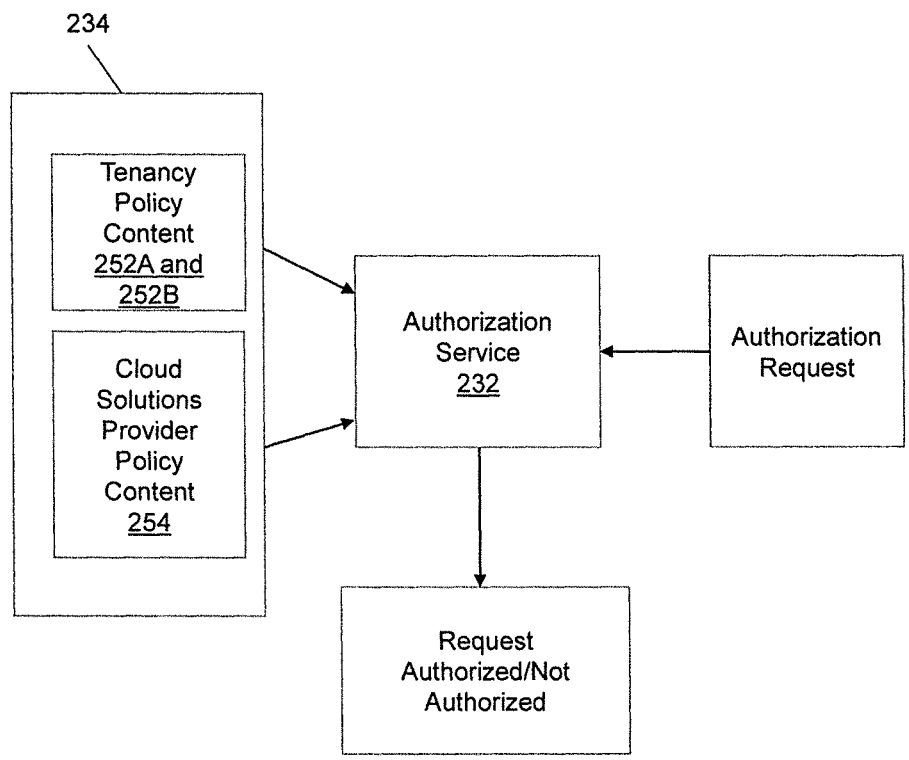
FIG. 2 illustrates an embodiment of an authorization service receiving an authorization request and reviewing the collection of policies stored in the policy store to determine if the authorization request is granted or denied.
Figure 3:
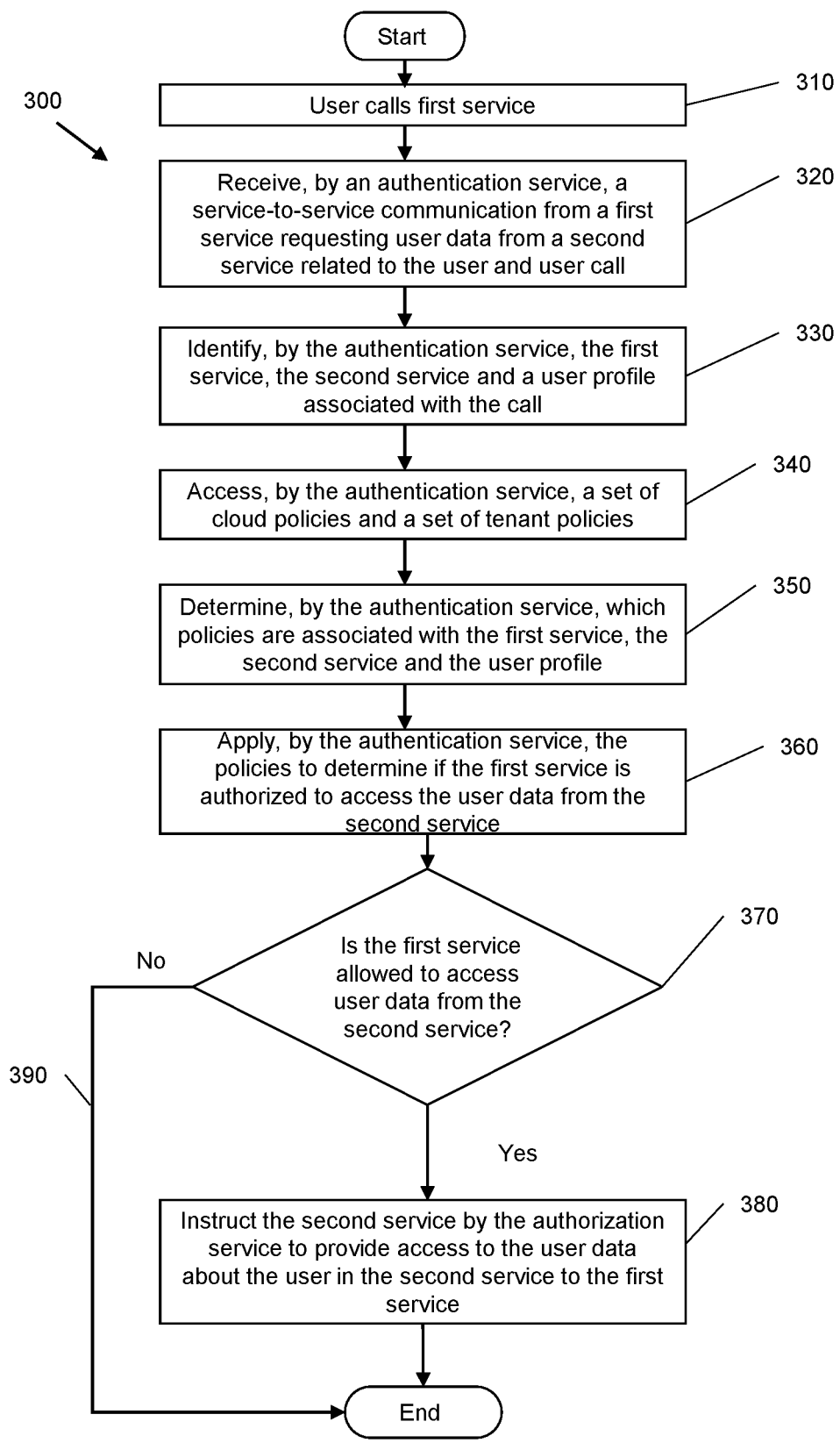
FIG. 3 illustrates another embodiment of an authorization service receiving an authorization request and reviewing the collection of policies stored in the policy store to determine if the authorization request is granted or denied.

As an example of the policy creation, storing, retrieving and review process, as shown in FIG. 1, assume that there are two different customer tenancy/accounts managed by the cloud solutions provider, namely tenancy A and tenancy B. The following could be some sample policies that administrators of these two tenancies might write (subject block-action block). As shown in FIGS. 2 and 3, it is to be assumed that all of these policies would be stored in the policy store 234. As shown in FIG. 2, policy store includes tenancy A policies 252A and tenancy B policies 252B. Example policies may be configured as follows but in computerized form and according to a selected syntax of a selected computer language/program:

TABLE 1

Tenancy A Policies

Allow Group Administrators to manage all resources—Administrators can do anything.
Allow Group developers to manage instances—Developers can launch/terminate compute hosts/instances.
Allow Group Human Resources to manage users—Human Resources personnel can add/remove users.

Tenancy B Policies

Allow Group Administrators to manage all-resources—Administrators can do anything.
Allow Group Network Administrators to manage networks—Network administrators can manage computer networks.
Allow Group Auditors to read audit-reports—Auditors can read audit reports.

As can be seen in tenancy A policies 252A and tenancy B policies 252B, these policies are related to who will have access to the resources of the customer and what resources of the customer will be able to be accessed by a service.

Regarding cloud solutions system provider policies (254 in FIG. 2), these system policies are written by the cloud solutions provider system administrator, as discussed earlier. Since the cloud solutions provider knows how its cloud system is architected, the cloud solutions provider knows which service is supposed to get access to which service. So, the cloud solutions provider system administrator writes the cloud solutions provider system policies. Actual customers are usually oblivious that these exist.

For example, assume that the cloud solutions provider recently launched service B and service B needs to talk to service Y. Assume that service Y handles file-type resources that are managed/owned by customers of service Y. The cloud solutions provider system administrator can write a system policy (254 in FIG. 2), as shown below.

TABLE 2

Cloud Solutions Provider Policies

Allow Service B to manage files—File-type resources are managed by service Y.

If the cloud solutions provider system administrator later wants to scope down the access service B gets, for example, service B can only add/remove/update files if the file name is prefixed with 'ServiceB', then the cloud solutions provider system administrator can modify the above policy to:
Allow Service B to manage files when file.name starts with 'ServiceB'

By adding a system policy like this, the cloud solutions provider system administrator can make sure proper checks and balances are in place so that services do not get very broad access rights.

It is to be understood that service refers to a software functionality or a set of software functionalities (such as the retrieval of specified information or the execution of a set of operations) with a purpose that different customers can reuse for different purposes, together with the policies that should control its usage (based on the identity of the customer requesting the service, for example).

Returning to the method of FIG. 1, The method of FIG. 1 describes a process for controlling a multi-tenant service-oriented architecture through the use of an authentication service. This allows the authentication service to control which service has access (e.g., via network communication calls) to resources owned by another customer. In particular, the system controls which services are authenticated and then authorized to access the resources of a customer. The process uses defined policies that allow the service to access resources owned by the customer, wherein the policies are accessed and reviewed by the authentication service. This is done based on the following steps with reference to FIGS. 1 and 2. In the following description, a "call" refers a service-to-service communication where one service calls another service with a request via a network communication. This includes interservice communications between microservices. A call may include a function call, an API call, or other type of computer performed network call.

Figure 4:
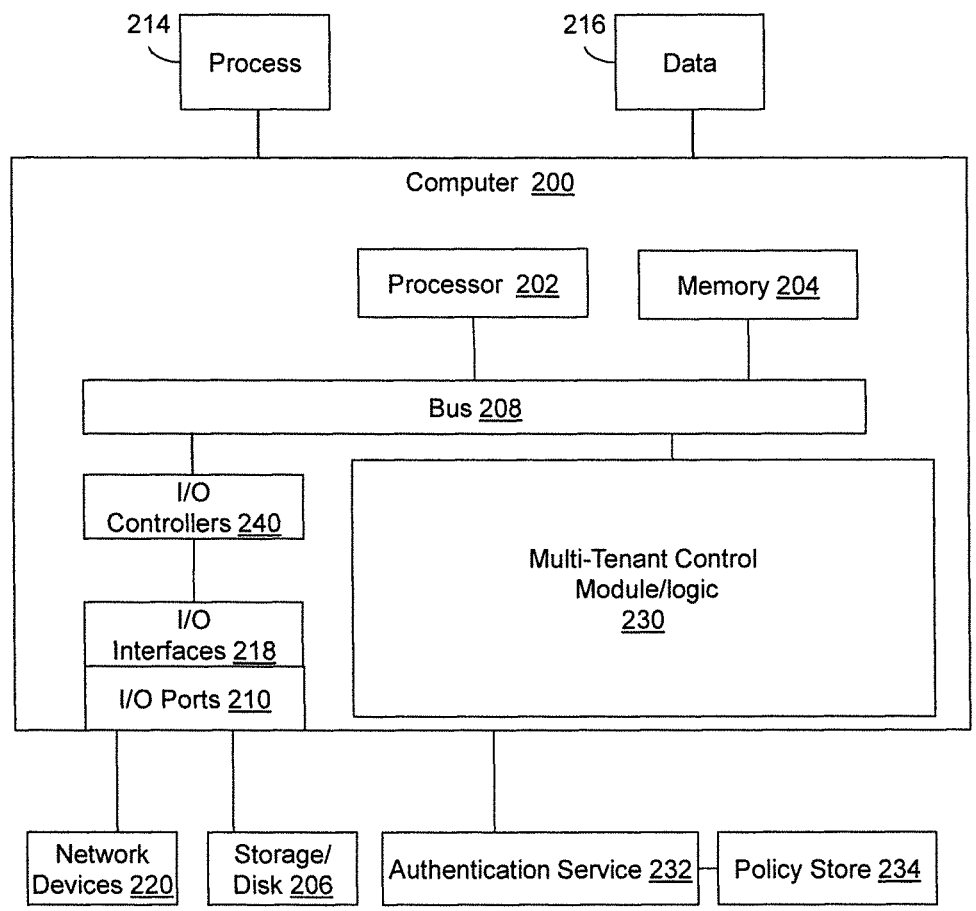
FIG. 4 illustrates an embodiment of a special purpose computing system configured with the example systems and/or methods disclosed.

At 110 (FIG. 1), a user or customer interacting with a computer service initiates a call to a service (A) and requests service (A) to access information from a service (X) related to the user or customer. For example, assume that the user is a patient who belongs to a medical services provider (service (X)) and the medical services provider (service (X)) has the medical records of the user stored on a database. In this example, assume that a system administrator (tenancy administrator) of the database for service (X) has written policies (tenancy policy content 252A and 252B in FIG. 2, as will be discussed in greater detail later) that allows medical care providers (outside medical services provider (service (A)) who are not affiliated with the customer's medical services provider (service (X)) to get access to the medical records of the user as long as the outside medical services provider (service (A)) can be properly authenticated and authorized. Furthermore, assume that the system administrator for the cloud solutions provider for the medical services provider (service (X) has written some policies (cloud solutions provider policy content 254 in FIG. 2, as will be discussed in greater detail later) that defines which service has access to which desired information. The policies written by the tenancy administrator for the medical services provider (service (X)) and the system administrator for the cloud solutions provider are stored in a database such as the policy store 234 (FIGS. 2 and 4).

In this example, the user may attempt to access the outside medical services provider website (service) by using a computer or other similar remote device to access an application programming interface (API) of the outside medical services provider. For example, the user calls the outside medical service provider (service (A)) by logging into the API of the outside medical service provider.

At 120, the service (A) calls an authentication service provider (such as authentication service provider 232 in FIGS. 2 and 4) to get a security token (T). In this manner, the authentication service 232 identifies service (A) as a service that is allowed to contact the authentication service and obtain a security token based upon a profile of service (A) that is accessible by the authentication service. It is to be understood that the authentication service provider is a system entity that creates, maintains, and manages identity information for customers while providing a system for the secure authentication of the identity of network clients by servers and vice versa, without presuming the operating system integrity of either. Using the above example, the service (service (A)) of the outside medical services provider then calls or otherwise interacts with the authentication service in order to get the security token (T). It is to be understood that security token (T) is a security token and refers to a security code embedded in software that allows the owner of the security token to be authenticated, namely, identifies the owner of the token.

At 130, the authentication service returns the security token (T) that identifies the service (A). In particular, the security token (T) is a server-to-server (s2s) token such as when a service using s2s calls another service in an async mode (asynchronous), without any user being involved. For example, a first service can automatically call a backup service to request and perform a backup operation every night. The backup service will get an s2s token from the authentication service that identifies the first service (the caller), call an object store service and upload the data to be backed up. In contrast, for on-behalf-of/delegation (OBO/delegation), tenancy admins have their policies that will get enforced, but not necessarily system policies. In this example, the security token (T) will assist in identifying/authenticating the caller as the service (service (A)) of the outside medical services provider when the service of the outside medical services provider attempts to contact another service (X), as will be discussed in greater detail later.

At 140, the service (service (A)) calls or otherwise interacts with the API of another service (service (X)) and provides the service (X) with the security token (T). Using the above example, the service (service (A) of the outside medical services provider) interacts with the API of the user's medical services provider (service (X)) and provides the API of the user's medical services provider (service (X) with the security token (T) that the service (service (A) of the outside medical services provider) obtained from the authentication service.

At step 150, the service (X) then authenticates the call or interaction with service (A) and identifies that, in fact, service (A) is calling or interacting with service (X). Continuing with the above example, the service of the user's medical services provider (service (X)) identifies that indeed it is the service (service (A) of the outside medical services provider) that is trying to call or otherwise interact with the service (service (X) of the user's medical services provider).

At 160, after the service (X) has identified that service (A) is calling or otherwise attempting to interact with service (X), service (X) then calls or otherwise interacts with the authentication service in order to authorize the call. In particular, service (X) contacts the authentication service to determine if service (A) is allowed to call or otherwise interact with the API of service (X) and is service (A) allowed to access the desired information of the user. In this manner, the authentication service identifies service (X) as a service that is allowed to contact the authentication and provide the security token to the authentication service based upon the collection of tenancy content policies 252A and 252B in the policy store 234 that is accessible by the authentication service 234.

Furthermore, the authentication service identifies the user and the user profile based upon the collection of tenancy content policies 252A and 252B that is accessible by the authentication service. Again, using the above example, once the service (service (X) of the user's medical services provider) has identified that it is the service (service (A) of the outside medical services provider) that is trying to call or otherwise interact with the service (service (X) of the user's medical services provider), the service (service (X) of the user's medical services provider) then calls or otherwise interacts with the authentication service to determine if the service (service (A) of the outside medical services provider) is allowed to call or otherwise interact with the API of the service (service (X) of the user's medical services provider). Also, the authentication service determines if the service (service (A) of the outside medical services provider) is allowed to access the desired patient information of the user.

At step 170, the authentication service checks or otherwise reviews the collection of policies (tenancy content policies 252A, tenancy content policies 252B and cloud solutions provider content policies 245) that are stored in a database (such as policy store 234 in FIGS. 2 and 4) to determine if the service (A) is allowed to call or otherwise interact with service (X). Also, the authentication service checks or otherwise reviews the collection of policies (tenancy content policies 252A, tenancy content policies 252B and cloud solutions provider content policies 245) that are stored in a database (such as policy store 234 in FIGS. 2 and 4) to determine what, if any, resource of the user is service (A) allowed to access. In this manner, the authentication service identifies which policies in the collection of policies are related to service (A), service (X) and the user (based upon a profile of the user) and reviews those particular policies to determine what, if any, resource of the user is service (A) allowed to access.

As discussed above, the administrator of the customer tenancy will write a set of policies that defines which user from their tenancy gets access to what resources and the administrator of the cloud services provider will also write another set of policies that will define what necessary internal services will get access to the desired user's resources. These policies are then stored in the policy store 234 (FIGS. 2 and 4) so that they can be used to determine i.) if the service (A) is allowed to call or otherwise interact with service (X) and ii.) what, if any, resource of the user is service (A) allowed to access.

As discussed above, the authentication service searches the tenancy policy content 252A and 252B to see if service (A) has a policy directed towards service (A) based upon the subject block of the tenancy policy content 252A and 252B and if such a policy (or policies exist) selects these policies. The authentication service then checks the selected policies to see if any of the selected policies grants the service (A) access to the desired information based upon the action block of the tenancy policy content 252A and 252B in the selected policies.

If the authentication service finds at least one policy that is related to service (A) and allows service (A) to access the desired information, the authentication service then checks the cloud solutions provider policy content 254 to determine if service (A) is supposed to get access to the desired information so that service (A) does not get very broad access rights. In short, the authorization service will authorize access or deny access based on whether the all of the criteria in the selected policies which are related to the user profile, the first service, and the second service have been met (or satisfied) based upon the information received by the authorization service related to the user profile, the first service, and the second service found in all of the policies stored in the policy store 234.

Using the above example, the administrator for the service (service (X) of the user's medical services provider) may write a policy that will allow certain outside medical providers to gain access to certain information of the user such as previous treatments for illnesses, previous results of physical examinations, previous results from surgeries or the like. Furthermore, the system administrator for the cloud solutions provider for medical services provider (service (X)) has written some policies that will determine the scope of the information that service (A) will be allowed to access such as only information related to a particular time period. In this manner, service (A) may get access to a user's information managed/controlled by service (X) but for only a particular time period.

At step 180, if the service (A) is authorized to access the desired information, then the authentication service notifies service (X) that service (A) is allowed to access the desired information of the user and the service (A) gains access to the desired information of the user through service (X). Using the above example, if the authentication service reviews the various policies stored in the policy store 234 and determines that the service (service (A)) of the outside medical services provider is authorized to gain access to the desired medical information of the user, the authentication service will then notify the service (service (X) of the user's medical services provider) that the service (service (A) of the outside medical services provider) is authorized to gain access to the user's medical records. The service (service (A) of the outside medical services provider) will then proceed to obtain the desired patient information of the user from the service (service (X) of the user's medical services provider).

At step 190, if the service (A) is not authorized to access the desired information, then the authentication service 232 notifies service (X) that service (A) is not allowed to access the desired information of the user and service (X) will then notify service (A) that service (A) will not be granted access to the desired user information. Using the above example, if the authentication service 232 reviews the various policies stored in the policy store 234 and determines that the service (service (A) of the outside medical services provider) is not authorized to gain access to the desired medical information of the user, the authentication service will then notify the service (service (X) of the user's medical services provider) that the service (service (A) of the outside medical services provider) is not authorized to gain access to the user's medical records. The service (service (X) of the user's medical services provider) will then notify the service (service (A) of the outside medical services provider) that access to the desired patient information of the user will not be granted.

In another embodiment, the method of FIG. 3 describes another process for controlling a multi-tenant service-oriented architecture through the use of an authentication service 234 (FIGS. 2 and 4). This also allows the authentication service 234 to control which service has access (e.g., via network communication calls) to resources owned by another customer/user. In particular, the system controls which services are authenticated and then authorized to access the resources of a customer/user. The process uses defined policies that allow the service to access resources owned by the customer/user, wherein the policies are accessed and reviewed by the authentication service 234. This is done based on the following steps with reference to FIGS. 2-4. In the following description, a "call" refers a service-to-service communication where one service calls another service with a request via a network communication. This includes interservice communications between microservices. A call may include a function call, an API call, or other type of computer performed network call.

With reference to FIG. 3, at 310, a user or customer interacting with a computer service initiates a call to a first service (service A) and requests service (A) to access information from a second service (service X), where the information is related to the user or customer. For simplicity, assume that the user, the first service (service A), the second service (service X), the authentication service, the security token (T), the tenancy policy content and the cloud solutions provider policy content are similar to (represent) the user, service A, service X, the authentication service 234, the security token (T), the tenancy policy content 252A and 252B and the cloud solutions provider policy content 254, as discussed above with respect to FIGS. 2 and 4. Also, it is to be understood that the authentication service 234 reviews and selects the tenancy policy content policies 252A and 252B and the cloud solutions provider policy content policies 254 in a similar manner as discussed above with respect to FIGS. 2 and 4.

In this example, the user may attempt to access the first service's (service A) website by using a computer or other similar remote device to access an application programming interface (API) of the first service (service A). For example, the user calls the first service (service A) by logging into the API of the first service (service A).

At 320, the first service (service A) calls an authentication service provider (such as authentication service provider 232 in FIGS. 2 and 4) to get a security token (T). In this manner, the authentication service 232 receives a service-to-service communication from a first service (service A) requesting user data from a second service (service X) related to the user and user call.

At 330, the authentication service 234 identifies the first service (service A), the second service (service X) and the user profile associated with the call. In particular, the authentication service 234 identifies the first service (service A) as a service that is allowed to contact the authentication service 234 and obtain a security token (T) based upon a profile of the first service (service A) that is accessible by the authentication service 234. If the authentication service 234 is able to identify the first service (service A) as a service that is able to obtain a security token (T), the authentication service 234 returns the security token (T) that identifies the first service (service A) to the first service (service A). As discussed above, the security token (T) will assist in identifying/authenticating the caller as the first service (service A) when the first service (service A) attempts to contact the second service (service X), as will be discussed in greater detail later.

Once the first service (service A) has obtained the security token (T) from the authorization service 234, the first service (service A) calls or otherwise interacts with the API of the second service (service X) and provides the second service (service X) with the security token (T). The second service (service X) then authenticates the call or interaction with service (A) and identifies that, in fact, service (A) is calling or interacting with service (X).

After the second service (service X) has identified that the first service (service A) is calling or otherwise attempting to interact with the second service (service X), the second service (service X) then calls or otherwise interacts with the authentication service 234 in order to authorize the call. In particular, the second service (service X) contacts the authentication service 234 to determine if the first service (service A) is allowed to call or otherwise interact with the API of the second service (service X) and is the first service (service A) allowed to access the desired information of the user. In this manner, the authentication service identifies the second service (service X) as a service that is allowed to contact the authentication 234 and provide the security token (T) to the authentication service 234 based upon the collection of tenancy content policies 252A and 252B and the cloud solutions provider policy content policies 254 stored in the policy store 234 that is accessible by the authentication service 234. Also, the authentication service 234 identifies the user profile of the user associated with the call to determine if such a user profile can be found in the collection of tenancy content policies 252A and 252B and the cloud solutions provider policy content policies 254 stored in the policy store 234 that is accessible by the authentication service 234.

At step 340, the authentication service 234 accesses the collection of tenancy content policies 252A and 252B and the cloud solutions provider policy content policies 254 stored in the policy store 234.

At step 350, the authentication service 234 determines which, if any, of the collection of tenancy content policies 252A and 252B and the cloud solutions provider policy content policies 254 stored in the policy store 234 contain information related to the first service (service A), the second service (service X) and the user. If any policies in the collection of policies are found to include the desired information, these policies are selected by the authentication service 234.

At step 360, the authentication service 234 applies the selected policies to determine if the first service (service A) is allowed to call or otherwise interact with the second service (service X). Also, the authentication service 234 checks or otherwise reviews the collection of policies (tenancy content policies 252A, tenancy content policies 252B and cloud solutions provider content policies 245) that are stored in a database (such as policy store 234 in FIGS. 2 and 4) to determine what, if any, resource of the user is the first service (service A) allowed to access. In this manner, the authentication service 234 identifies which policies in the collection of policies are related to the first service (service A), the second service (service X) and the user (based upon a profile of the user) and reviews those particular policies to determine what, if any, resource of the user is the first service (service A) allowed to access.

As discussed above, the administrator of the customer tenancy will write a set of policies that defines which user from their tenancy gets access to what resources and the administrator of the cloud services provider will also write another set of policies that will define what necessary internal services will get access to the desired user's resources. These policies are then stored in the policy store 234 (FIGS. 2 and 4) so that they can be used to determine i.) if the first service (service A) is allowed to call or otherwise interact with the second service (service X) and ii.) what, if any, resource of the user is the first service (service A) allowed to access from the second service (service X).

As discussed above, the authentication service 234 searches the tenancy policy content 252A and 252B to see if the first service (service A) has a policy directed towards the first service (service A) based upon the subject block of the tenancy policy content 252A and 252B and if such a policy (or policies exist) selects these policies. The authentication service 234 then checks the selected policies to see if any of the selected policies grants the first service (service A) access to the desired information based upon the action block of the tenancy policy content 252A and 252B in the selected policies.

If the authentication service 234 finds at least one policy that is related to the first service (service A) and allows the first service (service A) to access the desired information, the authentication service 234 then checks the cloud solutions provider policy content 254 to determine if the first service (service A) is supposed to get access to the desired information so that the first service (service A) does not get very broad access rights. In short, the authorization service 234 will authorize access or deny access based on whether the all of the criteria in the selected policies which are related to the user profile, the first service (service A), and the second service (service X) have been met (or satisfied) based upon the information received by the authorization service 234 related to the user profile, the first service (service A), and the second service (service X) found in all of the policies stored in the policy store 234.

At step 370, if the first service (service A) is authorized to access the desired information, then the authentication service 234 notifies the second service (service X) that the first service (service A) is allowed to access the desired information of the user from the second service (service X).

At step 380, if the first service (service A) is authorized to access the desired information, then the authentication service 234 instructs the second service (service X) to notify the second service (service A) that the first service (service A) is allowed to access the desired information of the user and the first service (service A) gains access to the desired information of the user through the second service (service X).

At step 390, if the first service (service A) is not authorized to access the desired information, then the authentication service 232 notifies the second service (service X) that the first service (service A) is not allowed to access the desired information of the user and the second service (service X) will then notify the first service (service A) that the first service (service A) will not be granted access to the desired user information.

Computing Device Embodiment

FIG. 4 illustrates an example special purpose computing device that is configured and/or programmed with one or more of the example systems and methods described herein, and/or equivalents. The example computing device may be a computer 200 that includes a processor 202, a memory 204, and input/output ports 210 operably connected by a bus 208. In one example, the computer 200 may include a multi-tenant control module/logic 230 configured to facilitate controlling of a multi-tenant service-oriented architecture, as performed by the methods of FIGS. 1-3. In one example, the computer 200 may also be operably connected to an authentication service 232 which interacts with policy store 234 and tenancy policy content 252A and 252B and cloud solutions provider content 254. In different examples, the logic 230 may be implemented in hardware, a non-transitory computer-readable medium with stored instructions, firmware, and/or combinations thereof. While the logic 230 is illustrated as a hardware component attached to the bus 208, it is to be appreciated that in other embodiments, the logic 230 could be implemented in the processor 202, stored in memory 204, or stored in disk 206.

In one embodiment, logic 230 or the computer is a means (e.g., structure: hardware, non-transitory computer-readable medium, firmware) for performing the actions described. In some embodiments, the computing device may be a special purpose server operating in a cloud computing system, a server configured in a Software as a Service (SaaS) architecture, a smart phone, laptop, tablet computing device, and so on.

Describing an example configuration of the computer 200, the processor 202 may be a variety of various specially programmed processors including dual microprocessor and other multi-processor architectures. A memory 204 may include volatile memory and/or non-volatile memory. Non-volatile memory may include, for example, ROM, PROM, and so on. Volatile memory may include, for example, RAM, SRAM, DRAM, and so on.

A storage disk 206 may be operably connected to the computer 200 via, for example, an input/output (I/O) interface (e.g., card, device) 218 and an input/output port 210. The disk 206 may be, for example, a magnetic disk drive, a solid-state disk drive, a floppy disk drive, a tape drive, a Zip drive, a flash memory card, a memory stick, and so on. Furthermore, the disk 206 may be a CD-ROM drive, a CD-R drive, a CD-RW drive, a DVD ROM, and so on. The memory 204 can store a process 214 and/or a data 216, for example. The disk 206 and/or the memory 204 can store an operating system that controls and allocates resources of the computer 200.

The computer 200 may interact with input/output (I/O) devices via the I/O interfaces 218 and the input/output ports 210. Input/output devices may be, for example, a keyboard, a microphone, a pointing and selection device, cameras, video cards, displays, the disk 206, the network devices 220, and so on. The input/output ports 210 may include, for example, serial ports, parallel ports, and USB ports.

The computer 200 can operate in a network environment and thus may be connected to the network devices 220 via the I/O interfaces 218, and/or the I/O ports 210. Through the network devices 220, the computer 200 may interact with a network. Through the network, the computer 200 may be logically connected to remote computers. Networks with which the computer 200 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   receive, by an authentication service, a service-to-service communication where a first service initiates a call that requests access to user data from a second service related to a user;
   identify, by the authentication service, the first service, the second service, and a user profile associated with the call;
   access, by the authentication service, a set of cloud policies and a set of tenant policies, wherein the set of cloud policies are configured to ensure that only selected services will be authenticated and authorized in order to access desired resources and wherein the set of tenant policies defines which user will have access to which resources and what resources will be able to be accessed by the first service;
   determine, by the authentication service, which selected cloud and tenant policies from the set of cloud policies and the set of tenant policies are associated with the user profile, the first service, and the second service;
   apply, by the authentication service, the selected cloud and tenant policies to the service-to-service communication to determine if the first service is authorized to access the user data from the second service; and
   authorize, by the authentication service, access or deny access to the first service based on whether the selected cloud and tenant policies related to the user profile, the first service, and the second service have been satisfied.

2. The non-transitory computer-readable medium of claim 1, wherein the instructions to apply the selected cloud and tenant policies further comprises instructions configured to cause the processor to:
   determine, by an authentication service, (i) if the first service is authorized to contact the second service, and (ii) if the first service is authorized to obtain the user data about the user from the second service by applying the selected cloud and tenant policies by the authorization service.

3. The non-transitory computer-readable medium of claim 1, wherein the instruction to identify, by the authentication service, the first service, the second service, and a user profile associated with the call further comprises instructions configured to cause the processor to:
   provide, by the authentication service, a security token to the first service.

4. The non-transitory computer-readable medium of claim 1, wherein the authentication service further comprises:
   an entity that creates, maintains, and manages identity information for the user.

5. The non-transitory computer-readable medium of claim 2, further comprising instructions that when executed by at least the processor cause the processor to:
responsive to the authorization service authorizing access to the first service, instruct the second service by the authentication service to provide access to the user data about the user in the second service to the first service.

6. The non-transitory computer-readable medium of claim 2, further comprising instructions that when executed by at least the processor cause the processor to:
responsive to the authorization service determining that the first service is not authorized to contact the second service, deny, by the authentication service, access to user data by the first service; and
instruct the second service by the authentication service that the first service is not authorized to contact the second service.

7. The non-transitory computer-readable medium of claim 2, further comprising instructions that when executed by at least the processor cause the processor to:
responsive to the authorization service determining that the first service is not authorized to obtain the user data about the user from the second service, deny, by the authentication service, access to user data by the first service; and
instruct the second service by the authentication service that the first service is not authorized to obtain the user data about the user from the second service.

8. A computing system, comprising:
an authentication service;
at least one processor connected to at least one memory operably connected to the authentication service and including instructions that when executed by at least the processor cause the processor to:
receive, by the authentication service, a service-to-service communication where a first service initiates a call that requests access to user data from a second service related to a user;
identify, by the authentication service, the first service, the second service, and a user profile associated with the call;
access, by the authentication service, a set of cloud policies and a set of tenant policies, wherein the set of cloud policies are configured to ensure that only selected services will be authenticated and authorized in order to access desired resources and wherein the set of tenant policies defines which user will have access to which resources and what resources will be able to be accessed by the first service;
determine, by the authentication service, which selected cloud and tenant policies from the set of cloud policies and the set of tenant policies are associated with the user profile, the first service, and the second service;
apply, by the authentication service, the selected cloud and tenant policies to the service-to-service communication to determine if the first service is authorized to access the user data from the second service; and
authorize, by the authentication service, access or deny access to the first service based on whether the selected cloud and tenant policies related to the user profile, the first service, and the second service have been satisfied.

9. The computing system of claim 8, wherein the instructions to apply, by an authentication service, the selected cloud and tenant policies further comprise instructions configured to cause the processor to:
determine i) if the first service is authorized to contact the second service, and ii) if the first service is authorized to obtain the user data about the user from the second service by applying the selected cloud and tenant policies by the authorization service.

10. The computing system of claim 8, wherein the instructions to identify, by the authentication service, the first service, the second service, and a user profile associated with the call further comprise instructions configured to cause the processor to:
provide, by the authentication service, a security token to the first service.

11. The computing system of claim 8, wherein the authentication service are further comprised of:
an entity that creates, maintains, and manages identity information for the user.

12. The computing system of claim 9, wherein the instructions are further comprised of instructions configured to cause the processor to:
responsive to the authorization service authorizing access to the first service, instruct the second service by the authentication service to provide access to the user data about the user in the second service to the first service.

13. The computing system of claim 9, wherein the instructions are further comprised of instructions configured to cause the processor to:
responsive to the authorization service determining that the first service is not authorized to contact the second service, deny, by the authentication service, access to user data by the first service; and
instruct the second service by the authentication service that the first service is not authorized to contact the second service.

14. The computing system of claim 9, wherein the instructions are further comprised of instructions configured to cause the processor to:
responsive to the authorization service determining that the first service is not authorized to obtain the user data about the user from the second service, deny, by the authentication service, access to user data by the first service; and
instruct the second service by the authentication service that the first service is not authorized to obtain the user data about the user from the second service.

15. A computer-implemented method, the method comprising:
receiving, by an authentication service, through at least a processor accessing one or more memories, a service-to-service communication where a first service initiates a call that requests access to user data from a second service related to a user;
identifying, by the authentication service, the first service, the second service, and a user profile associated with the call;
accessing, by the authentication service, a set of cloud policies and a set of tenant policies, wherein the set of cloud policies are configured to ensure that only selected services will be authenticated and authorized in order to access desired resources and wherein the set of tenant policies defines which user will have access to which resources and what resources will be able to be accessed by the first service;
determining, by the authentication service, which selected cloud and tenant policies from the set of cloud policies and the set of tenant policies are associated with the user profile, the first service, and the second service;
applying, by the authentication service, the selected cloud and tenant policies to the service-to-service communication to determine if the first service is authorized to access the user data from the second service; and authorizing, by the authentication service, access or denying access to the first service based on whether the selected cloud and tenant policies related to the user profile, the first service, and the second service have been satisfied.

16. The computer-implemented method of claim 15, wherein applying the selected cloud and tenant policies further includes:

determining, by the authentication service, (i) if the first service is authorized to contact the second service, and (ii) if the first service is authorized to obtain the user data about the user from the second service by applying the selected cloud and tenant policies by the authorization service.

17. The computer-implemented method of claim 15, wherein identifying, by the authentication service, the first service, the second service, and a user profile associated with the call further includes:

providing, by the authentication service, a security token to the first service.

18. The computer-implemented method of claim 16, wherein the method further comprises:

responsive to the authorization service authorizing access to the first service, instructing the second service by the authentication service to provide access to the user data about the user in the second service to the first service.

19. The computer-implemented method of claim 16, wherein the method further comprises:

responsive to the authorization service determining that the first service is not authorized to contact the second service, denying, by the authentication service, access to user data by the first service; and instructing the second service by the authentication service that the first service is not authorized to contact the second service.

20. The computer-implemented method of claim 16, wherein the method further comprises:

responsive to the authorization service determining that the first service is not authorized to obtain the user data about the user from the second service, denying, by the authentication service, access to user data by the first service; and instructing the second service by the authentication service that the first service is not authorized to obtain the user data about the user from the second service.

* * * * *

UNITED STATES PATENT AND TRADEMARK OFFICE
CERTIFICATE OF CORRECTION

PATENT NO. : 11,196,749 B2
APPLICATION NO. : 16/395905
DATED : December 7, 2021
INVENTOR(S) : Bhuiyan et al.

Page 1 of 1

It is certified that error appears in the above-identified patent and that said Letters Patent is hereby corrected as shown below:

In the Specification

In Column 6, Line 20, delete "FIG. 1, The" and insert -- FIG. 1, the --, therefor.

In the Claims

In Column 18, Line 12, in Claim 11, delete "are" and insert -- is --, therefor.

In Column 18, Line 66, in Claim 15, delete "applying ," and insert -- applying, --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*